Jan. 25, 1955 T. D. HEATH 2,700,592
METHOD OF CARRYING OUT ENDOTHERMIC REACTIONS
UNDER FLUIDIZING CONDITIONS
Filed March 13, 1950 4 Sheets-Sheet 1

FIG. I.

INVENTOR:
THOMAS D. HEATH,
BY
ATTORNEY

Jan. 25, 1955

T. D. HEATH 2,700,592

METHOD OF CARRYING OUT ENDOTHERMIC REACTIONS UNDER FLUIDIZING CONDITIONS

Filed March 13, 1950

INVENTOR:
THOMAS D. HEATH,
BY
ATTORNEY

INVENTOR:
THOMAS D. HEATH,
BY
ATTORNEY

Jan. 25, 1955

T. D. HEATH 2,700,592

METHOD OF CARRYING OUT ENDOTHERMIC REACTIONS
UNDER FLUIDIZING CONDITIONS

Filed March 13, 1950

INVENTOR:
THOMAS D. HEATH,
BY
ATTORNEY

United States Patent Office 2,700,592
Patented Jan. 25, 1955

2,700,592

METHOD OF CARRYING OUT ENDOTHERMIC REACTIONS UNDER FLUIDIZING CONDITIONS

Thomas D. Heath, Westport, Conn., assignor to The Dorr Company, Stamford, Conn., a corporation of Delaware Application March 13, 1950, Serial No. 149,339

5 Claims. (Cl. 23—224)

This invention relates to the method of carrying out endothermic reactions under fluidized-solids conditions wherein heat transfer to the endothermic reaction chamber is effected by means of an inert diluent solid.

More specifically, this invention relates to a method for the recovery of elemental free sulfur from pyritic solids, such as ores.

The controlled supplying of heat to endothermic reactions is fraught both with chemical and economic pitfalls. For instance, pyritic ores today are roasted in a large variety of furnaces and for innumerable purposes but, in general, these methods are very inefficient and wasteful, with very little attempt being made to recover the excess sulfur as a by-product. In furnaces like the Herreshoff type or Wedge type there is such difficulty experienced in attempting to control the temperatures by either adding or removing heat that there occurs either localized over-burning of the particles or localized under-burning, with subsequent non-recovery of recoverable materials, with its consequent poor yields. Because of the relatively static condition of the particles during processing in these conventional reactors, it is difficult to get adequate heat exchange in any endothermic reaction carried out therein.

It is therefore an object of this invention to devise a method for efficiently carrying out endothermic reactions in which solids and gases are interacting under solids-fluidization conditions. It is another object to devise a method and apparatus for recovery of elemental sulfur by endothermic reaction from pyritic solids.

These named objects, and others which will appear as this specification proceeds, may be accomplished in an embodiment of this invention which may be described as comprising a multiplicity of reactors in which solids are maintained in a fluidized condition or state and which uses an inert material to transfer the heat from a heat-generating zone to a heat absorbing (enthothermic reactor) zone. By using an inert, fluidizable material a large surface area per solids volume can be attained and very efficient heat exchange will result. By an inert material is meant a solid substance which does not take part in the endothermic reaction and may be, for example, sand, fine ceramic balls, etc.

Before describing the specific invention in greater detail, a brief description of the fluidized state will prove helpful.

A fluidized solids reactor or roaster or furnace in its most simple form is a vertical vessel having a perforated horizontal partition in its lower portion. Finely divided solids are supplied to the vessel above the partition by a conduit and gas is passed upwardly from the bottom of the vessel through the partition and through the powdered solids. The gas passes through the solids at such a rate that the solids are kept as a suspended bed or layer in the vessel. The solids are in dense, turbulent suspension and are usually referred to as a fluidized bed.

A fluidized bed is a very dense suspension of fine solids in a supporting flowing gas. The density or solids-concentration per unit volume of such a fluidized bed is very high, being commonly of the order of 10 to 100 pounds of solids per cubic foot of bed volume. This bed density is to be contrasted with typical dilute dispersions or suspensions, such as dusty air, wherein the density of solids concentration is of the order of only $1/50$ of a pound per cubic foot of the dispersion. In addition, the solid particles of a fluidized bed are in a high state of turbulence or erratic, zig-zag motion in the bed even when the suspending gas velocity is quite low; this high turbulence causes intimate and rapid mixing of the solids particles so that in a typical bed complete mixing of the solids appears to take place instantaneously. A fluidized bed, because of its high density and great turbulence, is noted for the rapid transfer of heat between its solid and gaseous components; this heat transfer is so rapid that a remarkable uniformity or homogeneity in the temperature of the bed results.

In some detail, a fluidized solids reactor consists essentially of one or more gas-tight chambers closed at the bottom with a plate perforated to permit upflow and secure uniform flow-distribution of gases admitted to a windbox below the plate; means for admission of subdivided material to be roasted, and means for removal of roasted material as well as means for removal from the reactor of the gas after it is reacted with fluidized particles therein. The gas passes into the windbox, thence upwardly through the perforated plate (hereafter referred to as the constriction plate) and through a mass of the finely divided solids to be roasted. The velocity of the gas through the mass or layer or bed of finely-divided solids (hereafter referred to as the fluidized bed) is controlled so that it suffices to produce an exceedingly turbulent agitation of the solids through which the gas is passing and which by its passage are densely suspended and, in general, caused to behave like a boiling liquid, including being capable of presenting a fluid level. This velocity, as measured in the upper portion of the reactor above the level of the densely suspended solids, is commonly of the order of 0.2 to 10.0 feet per second, and is referred to as superficial velocity. The velocity of the gas, while it is essential that it be in a range sufficient to "fluidize" the solids, must be below the rate at which all or substantially all of the solids suspended would be entrained and carried quickly out of the reactor as a dispersed or dilute suspension in the exit gas. Such a dispersed suspension behaves substantially like the exit gas and is unlike the fluidized bed. The means for removal of roasted solids from the reactor will usually comprise a vertical or steeply inclined conduit leading outside the reactor and provided with means for permitting a free discharge of the solids but not a free discharge of gases from the chamber. The minimum depth of the fluidized bed of solids within the reactor may be determined by the elevation of the discharge means as measured upward from the constriction plate. The depth will commonly be of the order of 1 to 5 feet, in smaller reactors, and up to 15 feet in larger reactors.

The approximate fluidizing velocity, the best depth of the fluidized bed, temperature control methods and other conditions of operation hereinafter referred to, which give the best results, may be determined by preliminary tests on the particular ore which is to be roasted by our process.

In summary, this invention involves a fluidized reactor filled with inert materials, which inert materials are heated to a high temperature. These heated materials are supplied to a second reactor wherein an endothermic reaction will occur. Here these particles intermingle with and slowly downwardly percolate through the fluidized particles which are to take part in the reaction, thus furnishing a large heat transfer area from which heat will flow to enable the endothermic reaction to proceed. The cooled inert materials are removed from the endothermic reaction chamber and are circulated back to the heating chamber where they are reheated to their original temperature. By thus applying the heat to the endothermic reaction mass, a very uniform and efficient heat transfer is effected and the reaction mass remains substantially thermally homogeneous.

The preferred embodiment of this invention now known to me has been chosen for the purpose of illustration but it is to be understood for that purpose only and is not to be taken as limiting, because obviously changes and substitutions are possible as long as they fall within the metes and bounds defined by the appended claims, including the equivalents of the claimed requirements. The invention has been illustrated in the accompanying drawings in which Fig. 1 is an idealized flowsheet outlining the basic portions of the process and showing the heat-absorbing zone (reactor A) and heat-producing zone (reactor B).

Figure 1:
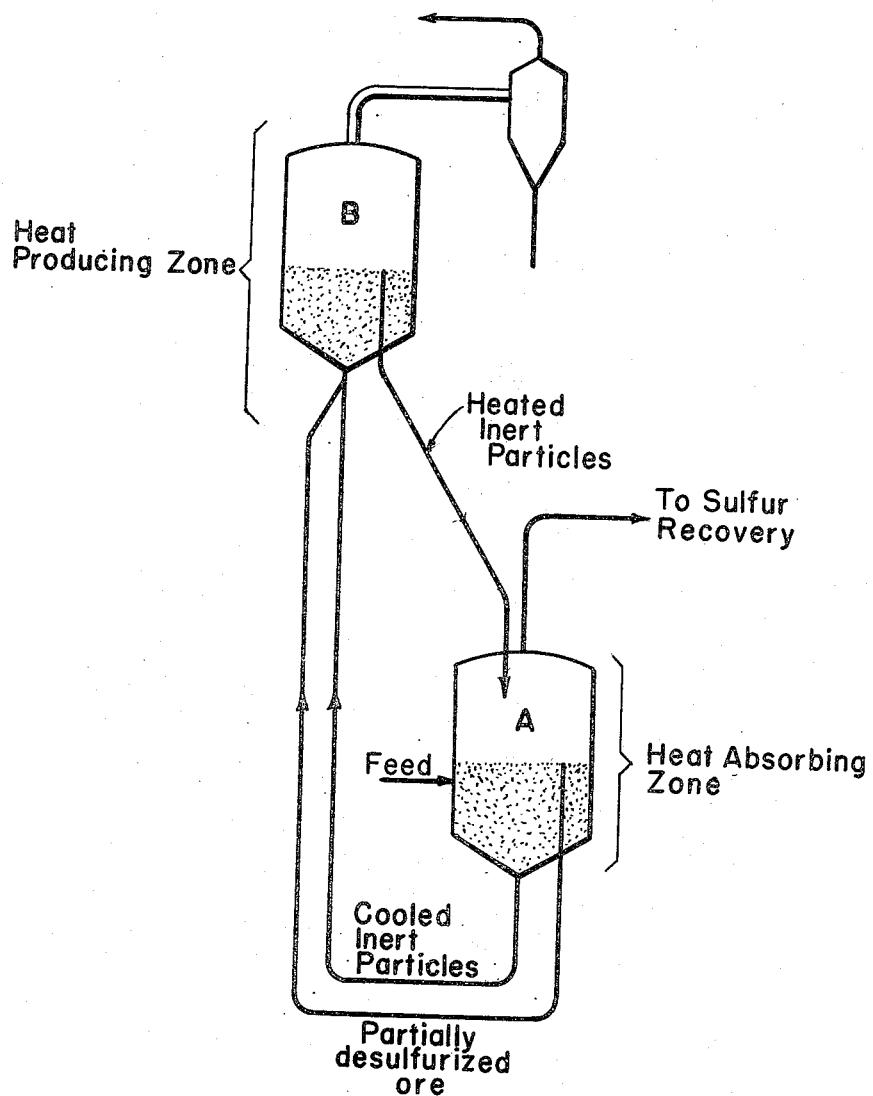

Returning now to Fig. 2, reactor A is the heat-consuming or endothermic zone and reactor B is the heat-producing zone. Particles to undergo endothermic reaction are supplied to hopper 20 and fed by screw-conveyor 21 in housing 80 into reactor collectively designated A, below the level of bed 22. Bed 22 is composed of fluidized reactant particles through which hot inert materials are slowly falling, meanwhile yielding their heat content. Bed 23, directly below bed 22, is composed almost exclusively of inert materials which have settled out. Reactor A is a vertical chamber with side walls 24 and lined with refractory brick 25. It is covered on the top by detachable cover plate 36[1] and on the bottom by shell 27. The reactant particles in reactor A are kept in a fluidized condition by gases entering through pipe 27[1] into windbox 28 and passing through the apertures 29 of constriction plate 30. The influent gas velocity is adjusted so that the inert materials are not fluidized but the reactant particles are. Thus the heated inert materials entering into bed 22 through pipes 91, 32 and 33 percolate downwardly through bed 22 imparting their heat to the reactant solid particles therein. Distributing means 31 serves to uniformly spread the heated particles among pipes 91, 32 and 33. The heat thus supplied causes an endothermic reaction to proceed and if the product is a vapor it passes up out of the bed 22 into freeboard 34, through outlet pipe 35 into solids separating means 36, where entrained solids are discharged through pipe 37. Product vapors continue through pipe 38 to a recovery system which may be condenser 39 where they are cooled down to their solidification or liquification point and recovered.

The inert materials from bed 23 pass into pipe 40 and are kept in an agitated condition by gases entering through pipe 41 and valve 42. The particles pass through valve 43, continue on through pipe 40 until they are picked up in the gas stream entering pipe 42 and swept into reactor B through pipe 85.

The reactant particles in reactor A are maintained in fluidized condition by gases entering through constriction plate 30. Behaving like a fluid, they spill over and down the downcomer 82, the top of which controls the height or upper level 44 of bed 22. The particles are kept in a fluidized condition in downcomer 82 by gases entering downcomer 82 through pipe 45 and valve 46. The particles pass through valve 47, continue on through downcomer 82 until they contact gases entering through pipe 48 and valve 49. They are then swept up pipe 50 into reactor B.

Reactor B is a vertical chamber for fluidizing solids and is similar to reactor A in construction, materials and design. It consists of side walls 51, upper plate 52 and bottom shell 53. Air for fluidizing the bed 57 is introduced through pipe 58, controlled by valve 59, passes through windbox 54 and finally through apertures 56 of constriction plate 55 into the bed 57. The influent air roasts the oxidizable materials found in reactor B and thus evolves heat. If there are no oxidizable materials from a given reaction, then fuel may be burned in this bed. The quantity of heat evolved is absorbed by the inert materials present in the bed 57 and heats these inert particles to a high temperature. They are maintained in a fluidized condition and spill over the top of and fill downcomer 60. The particles in downcomer 60 are kept in a fluidized condition by gases entering through pipe 61 and valve 62. By keeping the particles fluidized in this downcomer, a further classification occurs and remaining reactant particles are blown out of the downcomer, leaving substantially ore-free inert particles.

The velocities of the gases entering reactor B and downcomer 60 are adjusted so that the inert particles are kept in a fluidized condition but are of such a rate that the reactant particles are entrained and carried out of the reactor or downcomer. The entrained particles are carried by the gases though freeboard space 63, through pipe 64 into cyclone 65, where the roasted solids are removed through pipe 66 to further recovery or reaction.

The gases from cyclone 65 are removed through pipe 66 where they either are discarded or further processed through pipe 67 or are recirculated by pipe 68. In passing through pipe 68, they are either compressed by compressor 95 located along pipe 61, passed through pipe 61, and used to fluidize the standpipe 60 or they are commingled with gases from pipe 38. These commingled gases, after passing through condenser 39, are compressed by compressor 69 and sent into pipe 70 for distribution to pipes 27, 41, 45 and 48.

Figure 2:
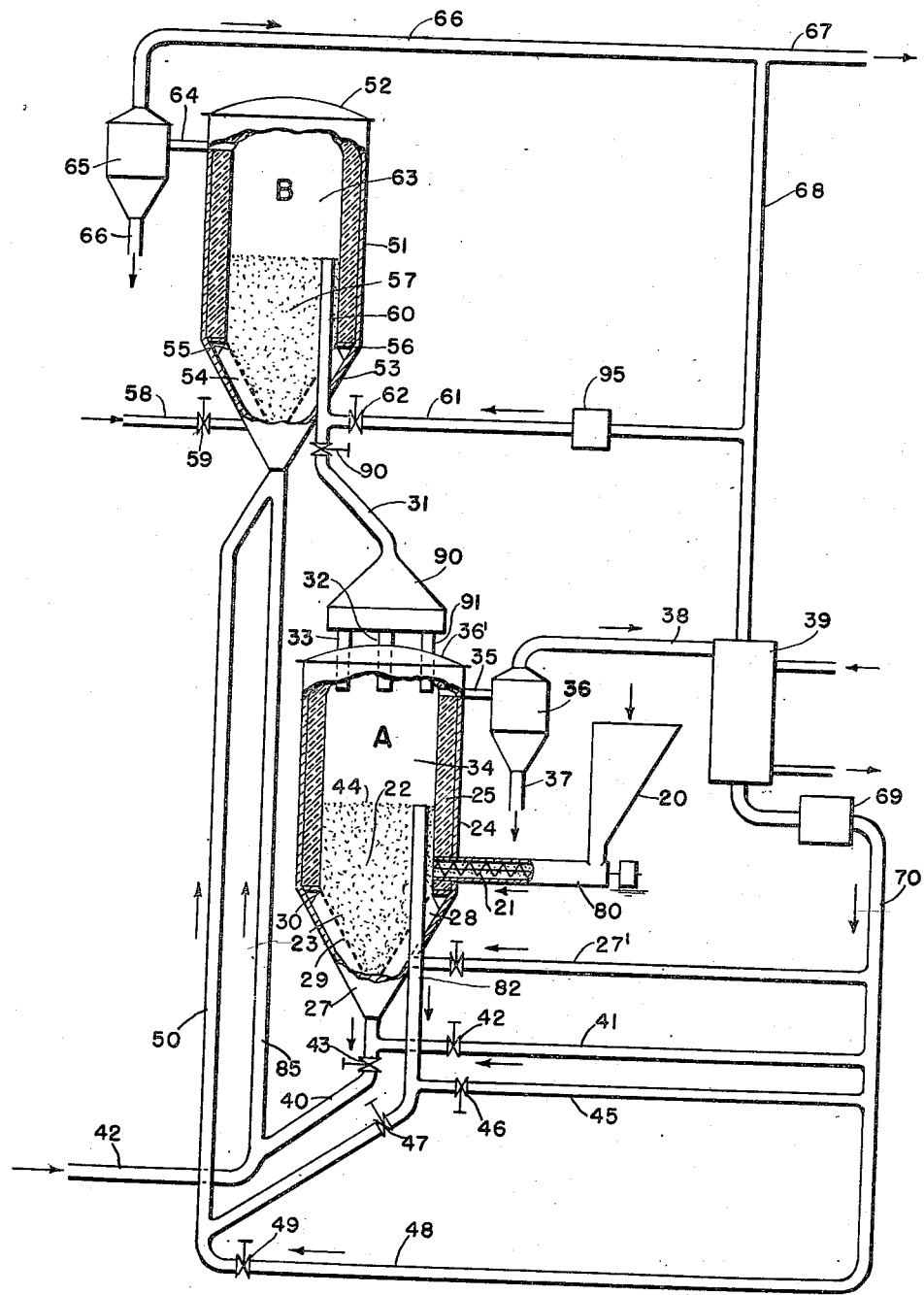
Fig. 2 shows reactors A and B in more detail and shows a suggested plant layout for efficiently carrying out endothermic reactions.
Figure 3:
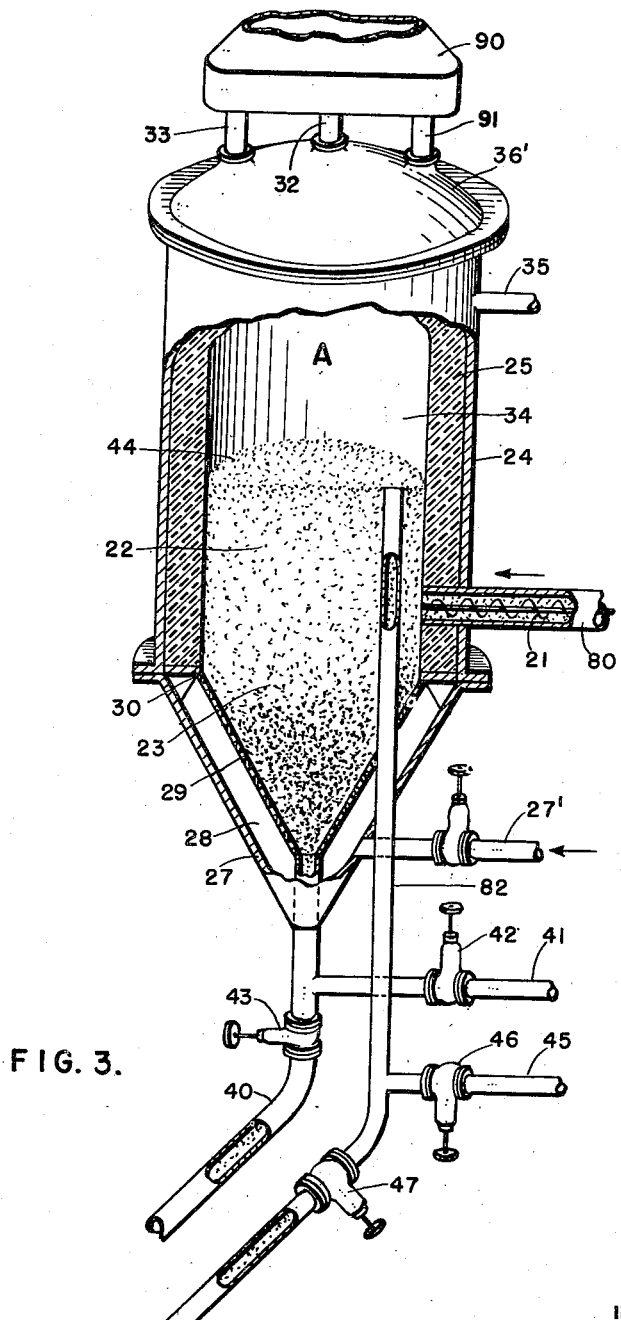
Figs. 3 and 4 show an enlarged view of reactors A and B respectively and show in detail the condition of the fluid bed and the particles in each reactor.

Figure 3 is an enlarged cutaway view of reactor A shown in Fig. 2. The heated inert particles enter reactor A through pipes 91, 32 and 33 or some other distributing device. These heated particles pass through freeboard zone 34 and enter into bed 22. In sinking slowly through bed 22 they impart heat to the reactant particles contained therein and cause an endothermic reaction to occur. In so giving up their heat the particles are somewhat cooled and these now-cooled inert particles eventually concentrate themselves in bed 23. The fluidizing gas enters through pipe 27, passes into windbox 28 and enters into the bed 23 through the apertures 29 of constriction plate 30. This gas velocity is so adjusted that the heavier heated particles concentrate themselves in bed 23 and the lighter particles pass upwardly and concentrate themselves in bed 22. Reactants are fed to the reactor through or by screw feed 21 located in housing 80. The reaction products from reactor A pass upwardly through freeboard space 34 and are removed through pipe 35 for further recovery. The partially reacted particles are removed from reactor A by passing downwardly through pipe 82 and their flow is controlled therein by valve 47. A reference back to Fig. 2 will show that these particles are then carried upwardly into reactor B. The now-cooler inert particles are removed from the bottom of bed 23, pass downwardly through pipe 40, controlled by valve 43, and then also are then swept upwardly into reactor B.

Figure 4:
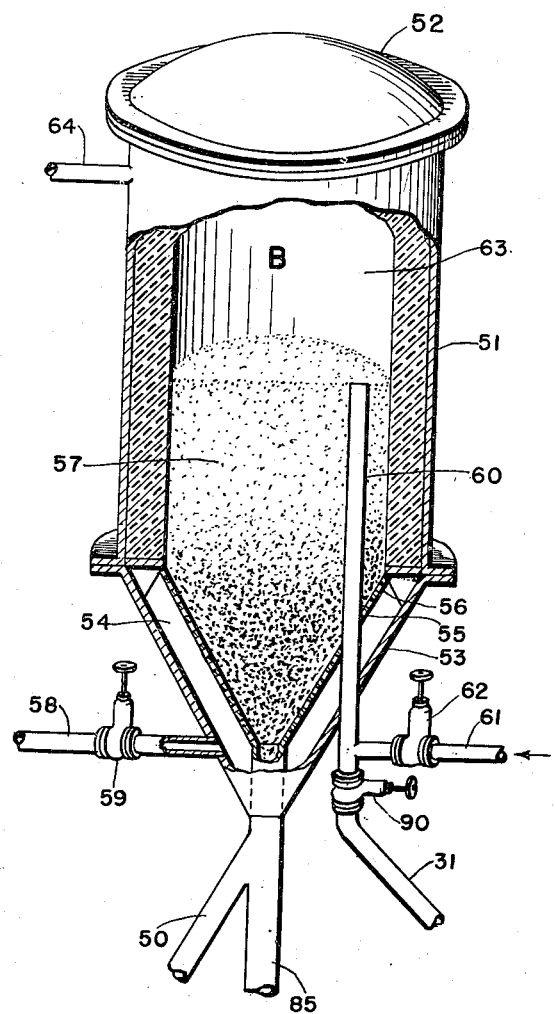

Fig. 4 is an enlarged cutaway view of reactor B shown in Fig. 2. The now-cooler inert particles are swept upwardly through pipe 50. The partially reacted ore or other particles which have undergone endothermic reaction are swept upwardly through pipe 85 if they contain oxidizable material. Pipe 85 meets pipe 50 at a point immediately subjacent to reactor B and the particles pass into reactor B in a commingled condition. Gas for fluidizing bed 57 is supplied through pipe 58 controlled by valve 59. After passing through apertures 56 of constriction plate 55 this gas serves a two-fold purpose. At one and the same time it fluidizes the inert materials in bed 57 and also serves to oxidize particles therein or to burn fuel when supplied. This process of oxidation serves to heat up the inert particles in this bed. The gas velocity entering through pipe 58 is adjusted so that it is high enough to fluidize the relatively larger inert particles of the bed but not to entrain them and is also high enough to cause entrainment of the reactant particles. These particles are carried through the bed, swept along in the gas stream through freeboard space 63 and carried out of the reactor through pipe 64 to further recovery. The now heated inert particles pass downwardly through pipe 60 and pass into reactor A. In pipe 60 a further classification is effected by introducing fluidizing gas through pipe 61 controlled by valve 62. The fluidizing gas introduced through pipe 61 is of sufficient velocity to classify the particles in pipe 60 so that the inert particles continue downwardly but any entrapped reactant particles become entrained in the gas stream and are swept upwardly into freeboard space 63 and thence out of the reactor.

*Example I*

As a specific embodiment of this invention, it is applicable to the recovery of sulfur from pyritic ores. The ore is fed to fluidizing reactor A, where it is contacted with the heated inert materials at about 630°–750° C. and the pyrite is caused to decompose endothermally giving up its first atom of sulfur following the reaction:

$$FeS_2 + heat \rightarrow FeS_{1.18} + 0.41 S_2 \text{ (gas)} \qquad (1)$$

(There is some disagreement among authorities as to whether the pyrite will decompose to form $FeS_{1.18}$ or FeS or some intermediate compound. However, the exact chemical composition of the iron sulfide formed is of no consequence to the application and therefore the presumption in this application is that $FeS_{1.18}$ forms in the decomposition reaction.)

This first atom of sulfur which splits off passes up through the fluidized bed and is carried in the fluidizing gas stream out of reactor A to an external point where it is cooled in condenser 39 and passed through means for the removal of sulfur, i. e., electrical precipitators, cyclones, etc.

The $FeS_{1.18}$ from Reaction 1 is now passed to the heat-producing zone by passing downwardly through pipe 82 and then being swept upwardly through pipe 50.

Also passed to this zone is the now relatively cooler inert material being carried through pipes 40 and 85. The inert materials are fluidized with air and the pyrohotite is burned to produce heat according to the following reactions which take place in the numerical sequence shown:

$$FeS_{1.18} \text{ (solid)} + 0.18 O_2 \rightarrow$$
$$FeS \text{ (solid)} + 0.18 SO_2 \text{ (gas)} + \text{heat} \quad (2)$$
$$FeS \text{ (solid)} + 1.5 O_2 \rightarrow FeO \text{ (solid)} + SO_2 \text{ (gas)} + \text{heat} \quad (3)$$
$$3FeO \text{ (solid)} + 0.5 O_2 \rightarrow Fe_3O_4 \text{ (solid)} + \text{heat} \quad (4)$$

The pyrohotite in burning liberates heat as shown above and this is used to heat the inert material to a high temperature. The amount of heat produced from Reactions 2, 3, 4 by carrying out the process in this manner is approximately twice the amount of heat necessary to carry out the sulfur distillation of Reaction 1. Thus there is more than a sufficiency of heat available and the over-all process is self-supporting.

The heated inert material now goes to zone (reactor A) where the endothermic reaction occurs. The completely or partially burned ore is blown out of the top of the heat-producing zone by using a sufficiently high gas velocity and is separated from the gas stream by appropriate solid separating means, and goes to further recovery or reaction beyond the scope of this invention.

An important feature of this invention is that the stable fluid bed in the heat absorbing zone (reactor A) is composed of finely-ground pyrite or $FeS_{1.18}$ while the stable fluid bed in the heat generating zone (reactor B) is composed of the heat-transferring pellets. In reactor A the iron sulfide is fluidized at a relatively low space velocity of gas of about 1 ft./sec. Under these conditions, the hot pellets which are dropped into the top of the fluid bed, sink slowly to the bottom of the chamber where they form an essentially non-fluid layer. However, in reactor B the space velocity may be relatively high (about 6–20 ft./sec.) and is great enough not only to fluidize the pellets but also to carry the fine burned iron sulfide out of the chamber. In practice it will generally be a simple matter to adjust the size and density of the pellets and the grind of the pyrite so that these two operations of reactor A and reactor B can be carried out.

The pyrite which is fed into the fluid bed in reactor A is usually −14 mesh (Tyler) or finer so that it will fluidize well at about 1 ft./sec. space velocity without excessive dust loss.

The pellets coming from reactor B to reactor A are at a temperature of about 800°–1000° C., low enough to prevent sticking of iron compounds to the pellets. These pellets are distributed more or less evenly over the surface of the fluid bed in the distillation chamber. Due to their selected size and density they sink slowly through the dense, turbulent fluid bed of decomposing pyrite and form a more or less static layer at the bottom of the chamber. In their descent through the fluid bed the hot pellets give up heat to the cooler, fluidized solids in the bed and to the fluidizing gases. The pellets continue to give up heat to the particles of the fluid bed as they lie on the top of the static layer of pellets due to circulation of the fluid bed over the static bed. The pellets further down in the cone of the chamber which no longer come in direct contact with the fluid bed preheat the incoming $SO_2$—$N_2$ gases.

The velocity of the $SO_2$—$N_2$ gases in the underflow pipe of reactor A and in the bottom part of the cone is great enough to prevent most of the fine iron sulfide solids from coming out the underflow with the pellets. This velocity need be only about 6–7 ft./sec. for −65 mesh iron sulfide particles. The rate of flow of pellets from reactor A to reactor B is controlled by valve 43 in the underflow pipe of reactor A.

*Example II*

This invention is also utilized for the preparation of carbon disulfide from carbon and sulfur. The carbon preferably is made from hardwood charcoal of low ash content and is ground fine, i. e., to −100 mesh or even to −200 mesh. This finely ground charcoal forms the stable fluid bed in reactor A.

The fluid charcoal bed is reactor A is maintained at a temperature between 750° and 1000° C. by small inert pellets at 1200°–2000° C. coming from reactor B, which sink slowly through the fluid bed of charcoal and settle to the bottom of reactor A where they form an essentially non-fluid bed of pellets. Liquid, solid, or gaseous sulfur of high purity is fed into reactor A near the bottom of the fluid bed of charcoal. The sulfur is immediately gasified upon contact with the fluidized charcoal particles at 750°–1000° C., and in rising through the hot charcoal the gaseous sulfur reacts with the charcoal to form carbon disulfide which leaves the fluid bed and reactor A as a gas. This reaction absorbs the heat which is provided to the bed by in the inert pellets from reactor B.

The bed of fine charcoal in reactor A is maintained in a fluid state at space velocities preferably below 1 ft./sec. by any fluidizing gas which does not react within reactor A or reacts to products compatible with the system. For example, nitrogen which is inert and does not react within reactor A may be used, or methane (or ethane or propane) which reacts to some extent to form the compatible products $CS_2$ and $H_2S$ may be used.

The exit gas from reactor A is treated for recovery of the carbon disulfide. In general this is carried out by condensing the sulfur and most of the carbon disulfide separately. $H_2S$ is removed by caustic scrubbing. The remainder of the $CS_2$ is absorbed by and stripped from a suitable solvent.

The cooled inert pellets from reactor A are cycled to reactor B where they are fluidized with air or combustion products while being heated to 1200°–2000° C. Some or all of this heat is supplied by combustion of charcoal coming from reactor A either by way of the underdrain along with the inert pellets or by way of the overflow pipe from the fluid charcoal bed. In many cases because of the high price of the low-ash hardwood charcoal, it will be desirable to use a low-cost combustible gas, oil, or coal as auxiliary fuel in reactor B for heating the inert pellets to 1200°–2000° C.

The exit gas from reactor B is either wasted or used in waste heat boilers. The hot inert pellets overflow into a downpipe where they are stripped of harmful gases by an inert or compatible gas (such as nitrogen or methane). From the downpipe they pass through a valve into a distributing system which drops them evenly into the charcoal bed in reactor A.

Charcoal is fed to reactor A and auxiliary fuel to reactor B as required by the conditions of operation.

*Example III*

This invention is also utilized for the preparation of water gas from carbon and steam. The carbon, which may be in the form of coke or anthracite coal, is ground fine, i. e., to about −65 mesh or finer, before being introduced into reactor A. This finely ground carbon forms the stable fluid bed within reactor A.

The fluidized carbon in reactor A is kept at a temperature between 900° and 1500° C., preferably about 1200° C., by small inert pellets at 1500° C. or higher coming from reactor B which sink slowly through the fluid bed of carbon and settle to the bottom of reactor A where they form an essentially non-fluid bed of pellets.

Steam is fed into the bottom of the cone at the bottom of reactor A. As the steam rises through the defluidized pellets it absorbs heat from the pellets. Then as the steam rises through the fluid bed of carbon at about 1200° C., it reacts with the carbon to form a gas containing essentially CO and $H_2$ with small amounts of $CO_2$ and $CH_4$. This reaction is strongly endothermic and uses up the heat provided to the bed by the inert pellets from reactor B.

The amount of steam introduced into reactor A is enough to keep the bed of carbon in a fluid state at a space velocity between 0.5 and 2.5 ft./sec.

The exit gas from reactor A is the finished product, a gas of high heating value which may be used for industrial or domestic heating purposes or in some industrial applications as a strong reducing agent.

The cooled inert pellets from reactor A are cycled to reactor B, where they are fluidized with air or combustion products while being heated to 1500° C. or higher. In general this heat is supplied by the combustion of carbon coming from reactor A mainly by way of the overflow pipe from the fluid carbon bed in reactor A.

The space velocity in reactor B is great enough to flow out all ash and unburned carbon fines from the reactor. The waste gas from reactor B may either be wasted directly or used in waste heat boilers.

The fluidized, hot, inert pellets in reactor B overflow into a downpipe and pass into reactor A to a distributing system which drops them evenly into the carbon bed in reactor A.

I claim:

1. A process for treating endothermically reactive finely-divided fluidizable solids capable of yielding a solid oxidizable reaction product as a result of endothermic reactions comprising the steps of supplying such solids to an endothermic reaction zone, maintaining such solids as a fluidized bed of solids exhibiting a liquid-like level by passing therethrough an uprising stream of gas at solids-fluidizing velocities, maintaining the bed solids at endothermic reaction temperatures to yield reaction products including solid oxidizable products by supplying hot inert solids to the bed to there contact the reactive bed solids, discharging reaction products from the zone, separately discharging inert solids from the zone and transferring them to an exothermic reaction zone, maintaining inert solids of the latter zone as a fluidized bed of solids exhibiting a liquid-like level by passing therethrough an uprising stream of free-oxygen bearing gas at solids fluidizing velocities, heating fluidized inert solids in the exothermic zone by supplying to that zone solid oxidizable reaction products discharged from the endothermic zone to exothermically oxidize such products in the oxygen-bearing gas in contact with the fluidized inert solids to thereby heat the inert solids, discharging gases and solid oxidized material from the zone, and separately discharging heated inert solids from the exothermic zone and transferring them to the endothermic reaction zone.

2. The process for preparing elemental sulfur from pyritic ores, which comprises supplying finely-divided fluidizable pyritic ores to an endothermic reaction zone, fluidizing said ores, contacting said fluidized ores with inert materials heated to a sulfur-volatilizing temperature, removing from the reaction zone and collecting resulting volatilized sulfur, separately transferring partially-reacted iron sulfide reaction products to a roasting zone, separately transferring inert material from the endothermic reaction zone to the roasting zone, roasting oxidizable particles in contact with fluidized inert material which is thereby heated, separately transferring said heated inert material to the endothermic reaction zone, and separately discharging the roasted mass from the roasting zone.

3. A process according to claim 2, wherein the temperature of the endothermic reaction zone is substantially 660° C.

4. A process according to claim 2, wherein the temperature of the roasting zone is substantially 900° C.

5. A process according to claim 2, wherein the roasted solids are discharged from the roasting zone by entrainment in the fluidizing gas passing through that zone by so controlling the fluidizing conditions that the velocity of the fluidizing gas is sufficient to entrain the roasted products in exiting gas but insufficient to entrain the inert solids.

References Cited in the file of this patent

UNITED STATES PATENTS

| | | |
|---|---|---|
| 2,376,564 | Upham et al. | May 22, 1945 |
| 2,455,915 | Borcherding | Dec. 14, 1948 |
| 2,579,398 | Roetheli | Dec. 18, 1951 |